W. H. KENNEDY.
HOIST FOR MOTOR TRUCKS.
APPLICATION FILED MAR. 21, 1918.

1,318,154.

Patented Oct. 7, 1919.
8 SHEETS—SHEET 1.

UNITED STATES PATENT OFFICE.

WILLIAM H. KENNEDY, OF CHICAGO, ILLINOIS, ASSIGNOR OF ONE-HALF TO LEWIS B. MILLER, OF CHICAGO, ILLINOIS.

HOIST FOR MOTOR-TRUCKS.

1,318,154. Specification of Letters Patent. Patented Oct. 7, 1919.

Application filed March 21, 1918. Serial No. 223,703.

*To all whom it may concern:*

Be it known that I, WILLIAM H. KENNEDY, a citizen of the United States, and a resident of the city of Chicago, county of Cook, and State of Illinois, have invented certain new and useful Improvements in Hoists for Motor-Trucks, of which the following is a specification.

My invention relates to improvements in hoists, such as are used especially in connection with motor trucks for dumping the swingingly mounted bodies thereof, and has for its object the production of apparatus of this character which will be of durable and economical construction and highly efficient in use.

Other objects will appear hereinafter.

The invention consists in the combinations and arrangements of parts hereinafter described and claimed.

The invention will be best understood by reference to the accompanying drawings forming a part of this specification, and in which, Figure 1, is a side elevation of a motor truck having hoisting mechanism embodying the invention, Fig. 2, a side elevation, partially in section, of the hoisting mechanism, Fig. 3, a view similar to Fig. 2, of a slightly modified form of construction, Fig. 4, an enlarged section taken on substantially line 4—4 of Fig. 1, Fig. 5, an enlarged section taken on substantially line 5—5 of Fig. 4, Fig. 6, a section taken on line 6—6 of Fig. 5, Fig. 7, a bottom plan view of the lower plate carried by the vertically movable element of the hoist, Figs. 8 and 9, sections taken on substantially lines 8—8 and 9—9, respectively, of Fig. 5, Fig. 10, a top plan view of the upper end of the hoist, Fig. 11, a top plan view of the upper guide plate used in connection with the vertically movable element of the hoist, Fig. 12, a section taken on substantially line 12—12 of Fig. 10, and Fig. 13, a section taken on substantially line 13—13 of Fig. 12.

The preferred form of construction as illustrated in the drawings, is employed in connection with a motor truck of conventional construction, in which is employed a frame 15 and a rotary driving shaft 16, the body 17 of the truck being swingingly connected at 18 with the frame 15.

Figure 1:
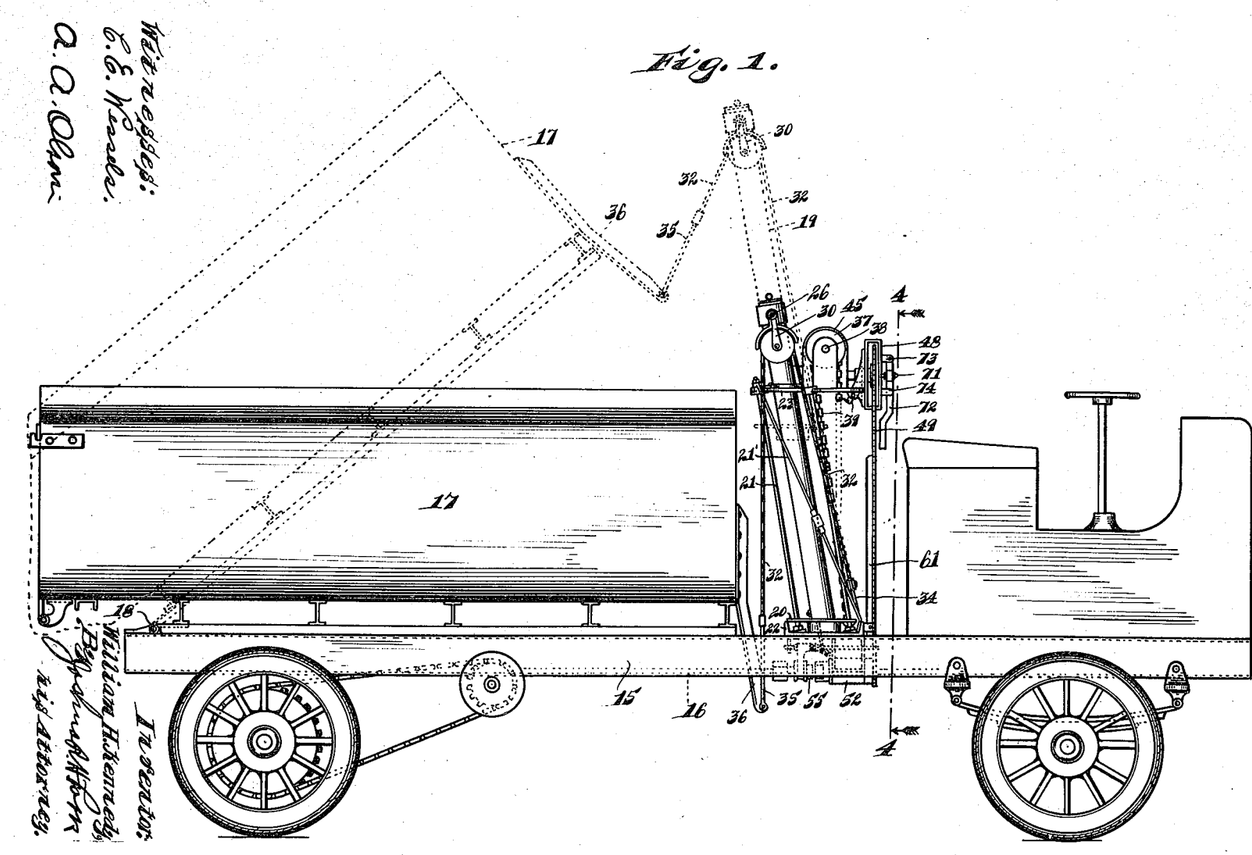
Figure 2:
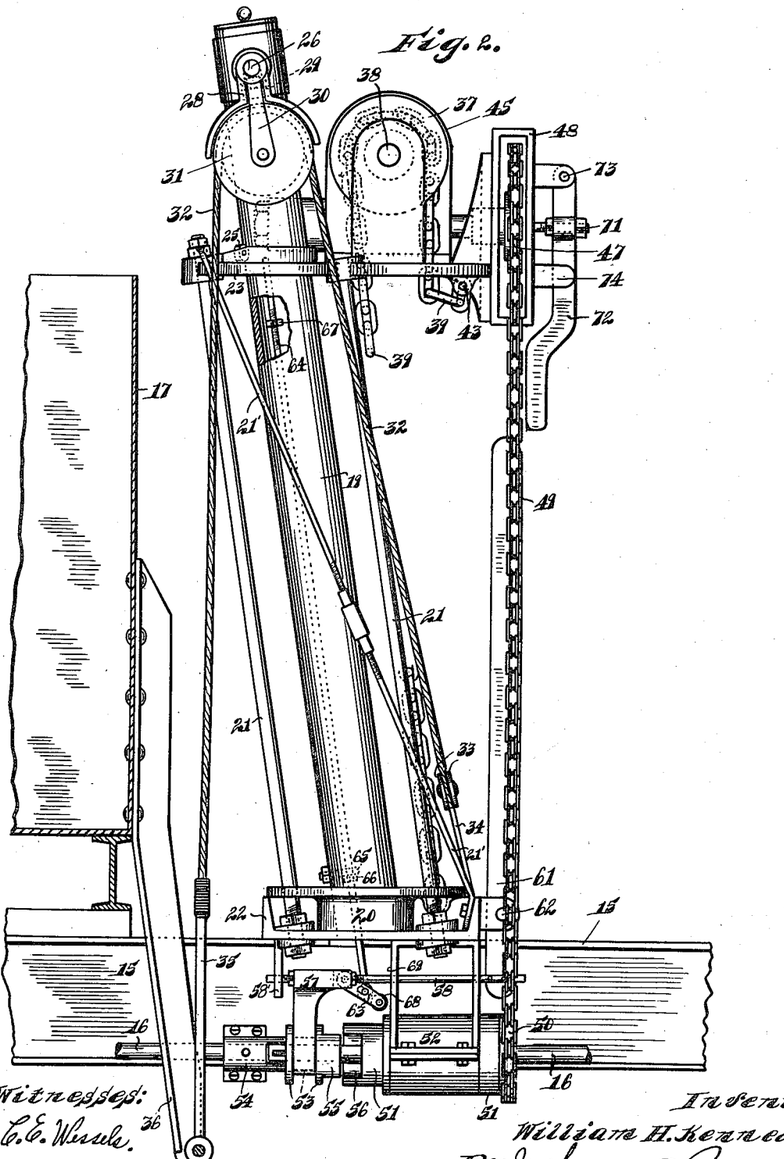
Figure 5:
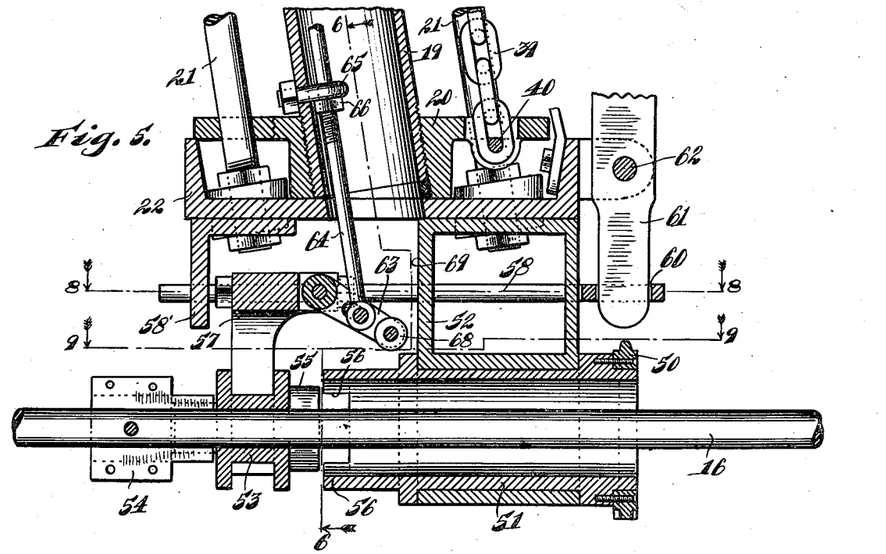
Figures 10, 11:
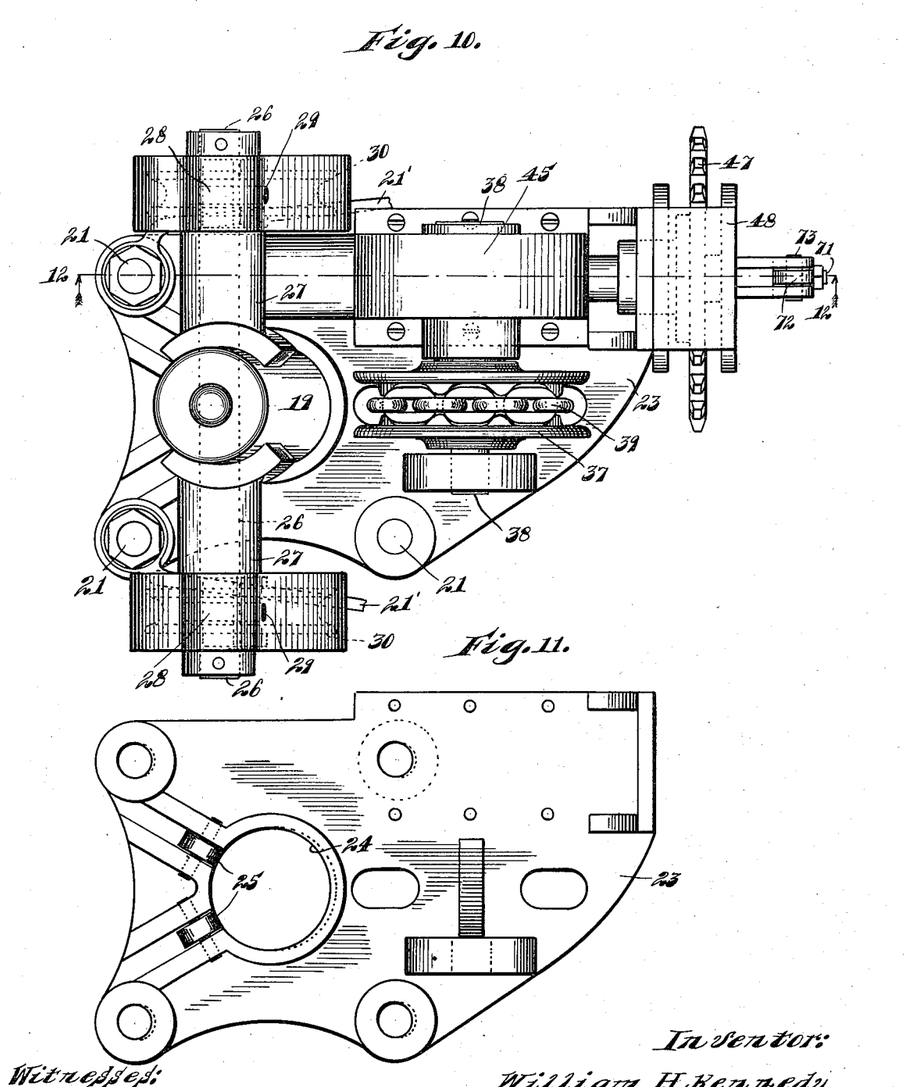

The hoist forming the subject matter of this application, is designed for arrangement immediately forward of the front end of the body 17 of the truck, and comprises a vertically movable element 19 in the form of a stout pipe, the lower end of which is rigidly secured in a plate 20, as clearly seen in Fig. 5. Said member 19, in the vertical movement thereof, is guided by a frame comprising 4 spaced parallel substantially vertically disposed bars 21, the lower ends of which are rigidly fastened in a channel 22, which in turn is rigidly fastened to the frame 15 of the truck. The upper ends of bars 21 are rigidly connected by means of a plate 23 in which is formed an opening 24, as seen in Fig. 11, for slidable engagement with the member 19. Rollers 25 are provided at one side of the opening 24 for engagement with the member 19 in order to alleviate friction. In order to brace the guide frame thus formed, longitudinally adjusted brace rods 21' are employed, which connect the rearward edge of the plate 23 and the front flange of the channel 22, as seen in Fig. 2.

Projecting through the upper end of the member 19 is a stout bar or bolt 26, the outer ends of which are braced by tubular nipples 27 fastened to the member 19 at opposite sides. Pivotally connected with and depending from the ends of member 26 are straps 28 in which are pivotally connected at 29 the upper ends of straps 30, in which are mounted channel pulleys 31. With this arrangement it will be seen that said pulleys are connected with the member 19 in such a manner as to permit of both lateral and longitudinal pivotal movement. Passing over the pulleys 31 are cables 32, the front ends of which are clamped between two elongated plates 33, which in turn are anchored by means of a plate or flange 34 to the channel member 22. The opposite ends of cables 32 are connected through the medium of connecting bars 35 with arms 36 depending from the front end of the truck body 17. The arrangement is such, as will be seen, that upon upward movement of the member 19, the body 17 will be caused to rise, the pulleys 21, in this operation, traveling along the cables 32 engaged thereby. The respective ends of the strap 28 coöperating with each pulley 21 are extended around the upper portion of the periphery of the pulley in order to prevent disengagement of the cable therefrom.

Figure 3:
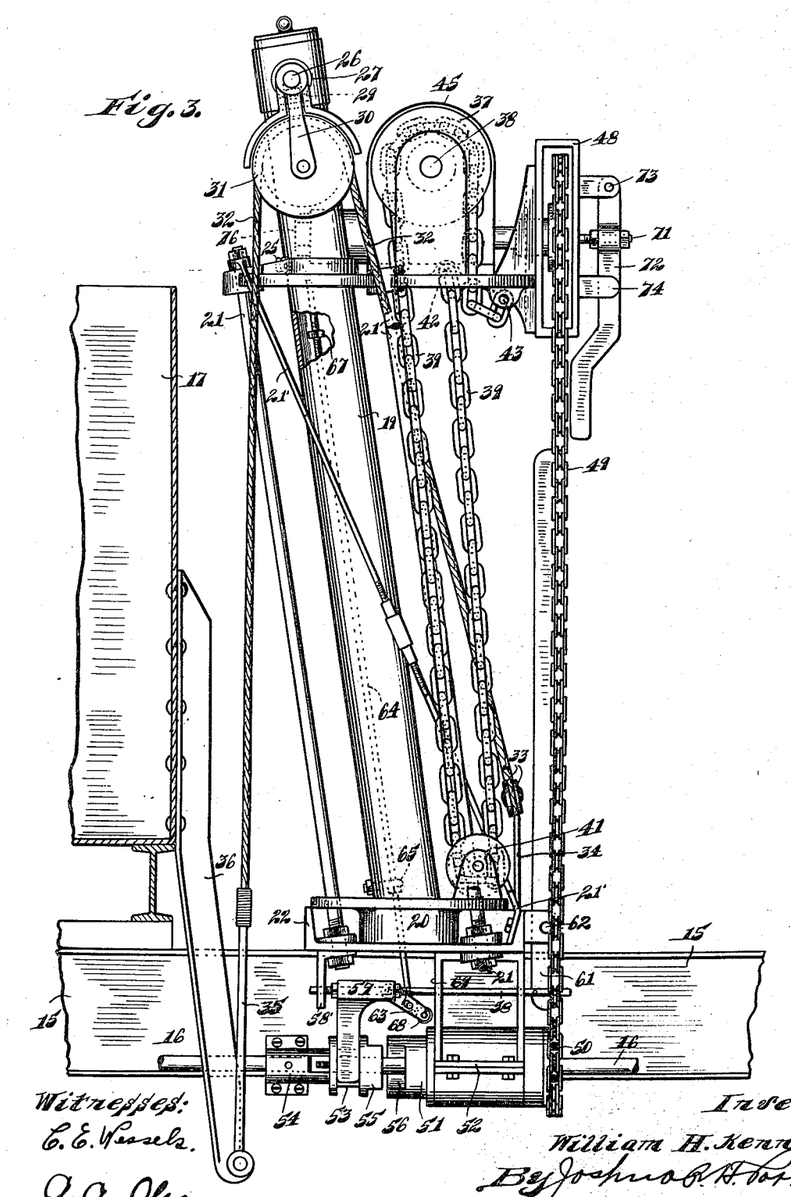
Figure 4:
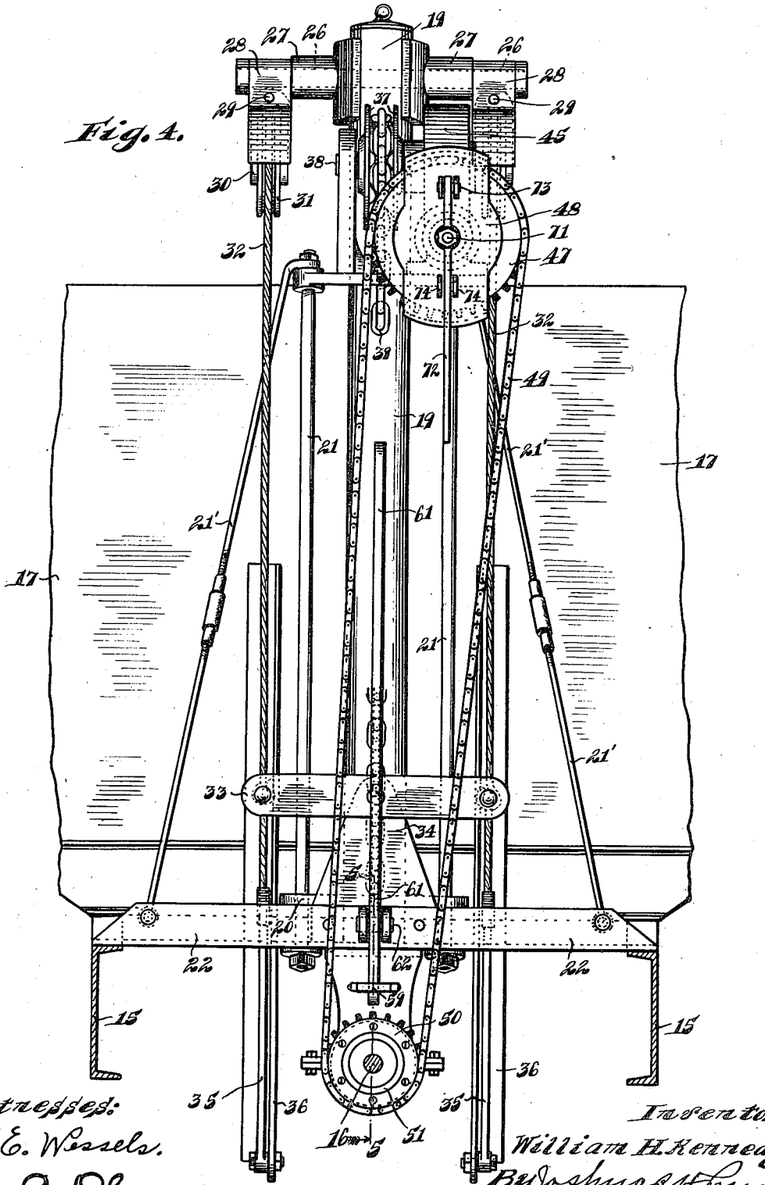

Vertical movement of the member 19, as mentioned, is effected through the medium of a channel sprocket wheel 37 fixed to a shaft 38, which is mounted in suitable bearings arising from the plate 23. Coöperating with the sprocket wheel 37 is a chain 39, one end of which is connected as at 40 (see Fig. 5) with the plate 20. Or, if desired, the chain 39 may extend downwardly around a pulley 41 mounted upon the plate 20 and then upwardly, in which event the end of the chain will be anchored, as at 42, to the plate 23, as seen in Fig. 3. With this arrangement, it will be seen that when the sprocket 37 is turned in clock-wise direction, the mentioned end of the chain 39 will be drawn upwardly, thus effecting upward movement of the hoisting member 19. The opposite end of the chain 39 may hang loosely from the sprocket wheel 37 if desired, or may be connected at 43 with the plate 23 in order to prevent the same from entangling in other parts of the mechanism. The plate 23 is suitably slotted, as seen in Fig. 11, to permit of the passage of chain 39.

Figure 12:
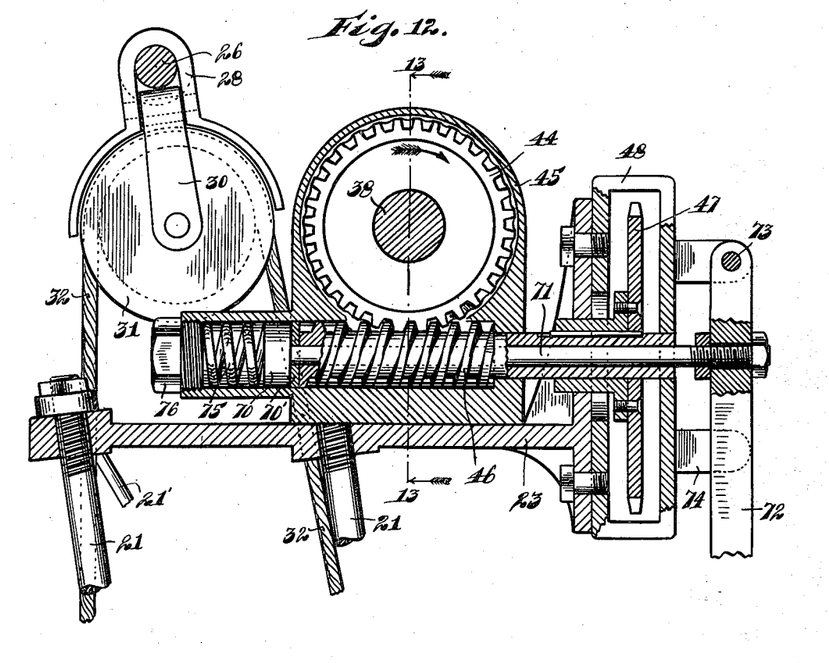
Figure 13:
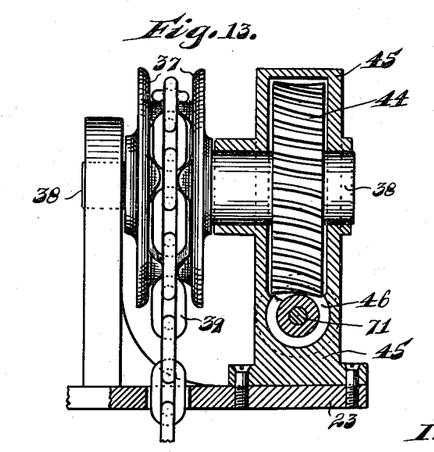

Connected with the shaft 38 of sprocket 37, is a worm wheel 44 arranged in a protecting housing 45, as seen in Figs. 12 and 13. The worm wheel 44 meshes with a worm 46, on one end of which is fixed a sprocket wheel 47 arranged in a frame member 48, secured to one end of plate 23. Around the sprocket wheel 47 passes an endless sprocket chain 49, which also passes around a sprocket wheel 50 fixed to one end of a tubular shaft 51 mounted in a suitable bearing 52 depending from the channel member 22, as clearly seen in Fig. 5. The opening through the shaft 51 is for the driving shaft 16 of the truck, considerable play being allowed for said drive shaft to allow for the usual vibration thereof when the truck is in use.

Figure 6:
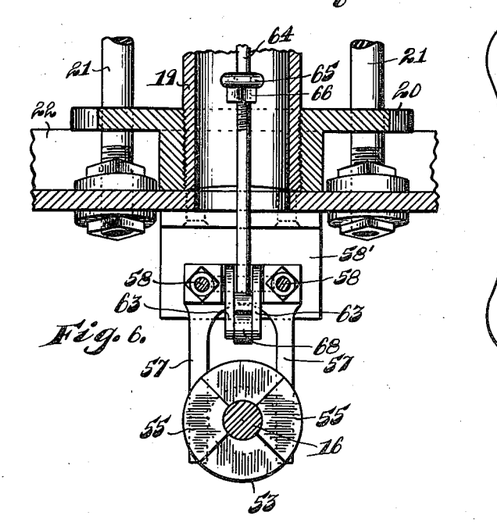
Figure 7:
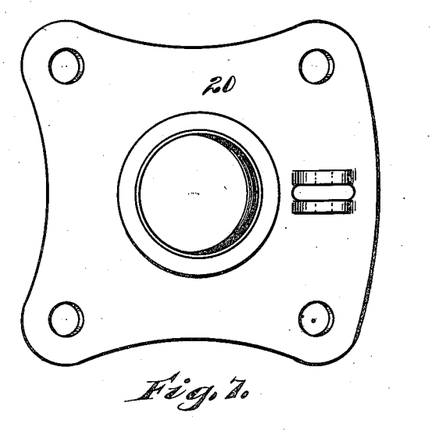
Figure 9:
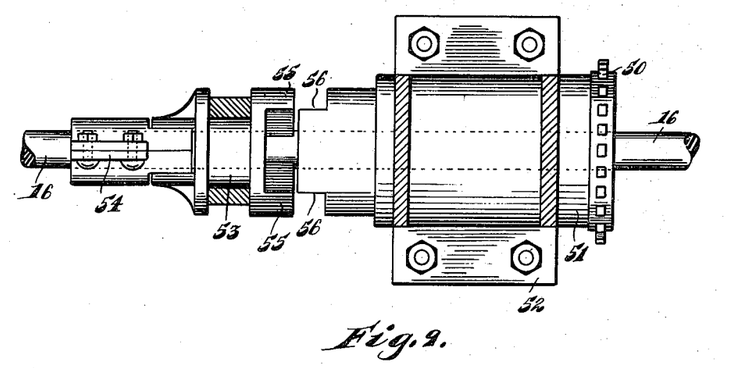

Operative connection between the driving shaft 16 and the tubular shaft 51 is effected through the medium of a shiftably mounted clutch member 53, one end of which is in permanent, though slidable, operative connection with a split clutch member 54 rigidly fastened to said shaft 16. The opposite end of clutch member 53, as seen in Figs. 5, 6 and 9, is provided with lugs 55 which are adapted, when said clutch member is shifted forwardly, to interlock with lugs 56 on the shaft 51, thus serving to operatively connect shaft 16 with shaft 51. When the clutch member 53 is at its rearward terminal of movement however, said shaft 51 will be disconnected from the drive shaft 16, the inoperative position of said clutch member as mentioned, being that shown in Figs. 5 and 9.

Figure 8:
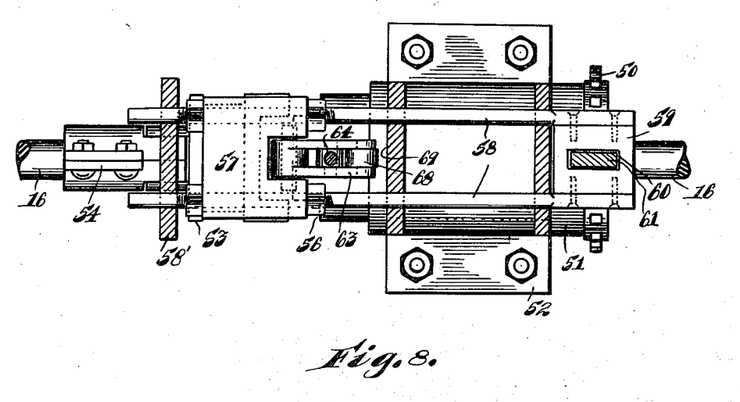

This shifting of clutch member 53 is effected by means of a shifting fork 57 carried by two spaced parallel bars 58, which are slidably mounted in a depending bearing 58' and the bearing 52 arranged at the underside of channel 22, as clearly seen in Figs. 5, 6 and 8. The bars 58 are connected at one end by a block or yoke 59, in which is formed a slot 60, which is engaged by the lower end of a lever 61 fulcrumed at 62 upon channel member 22. With this arrangement it will be seen that, when the upper end of lever 61 is rocked rearwardly, the clutch member 53 will be moved forwardly into operative position in order to establish connection between shafts 16 and 51. When this connection is established, it will be seen that the shaft 16 will be operatively connected with the housing member 19 effecting upward movement thereof, and hence dumping of the body of the truck.

In order to effect automatic shifting of clutch 53 to inoperative or disengaging position, a rocker member 63 is provided upon shifting fork 57. The member 63 is rocked through the medium of a rod 64 connected at its lower end therewith and which projects upwardly into the housing member 19 through a guide loop 65 provided in said member 19. Provided upon said rod 64 are two nuts 66 and 67 so positioned that when the housing member reaches its upper terminal of movement the loop 65 will engage with the nut 67 and cause rod 64 to be moved upwardly, and, when said housing member reaches its lower terminal of movement, said loop 65 will engage with the nut 66 and cause said rod to be moved downwardly. The free end of the member 63 is provided with a roller 68 which is adapted to contact or ride upon the surface 69 of the bearing member 52. The arrangement is such that, when the clutch member 53 is in operative position, the roller 68 will be in engagement with the surface 69. This being the case, when the hoisting member reaches either of its terminals of movement, causing shifting of the rod 64 and hence rocking of the member 63, the roller 68, riding upon the surface 69 will cause the shifting fork 57 to be pushed rearwardly or to disengaging position. Thus it will be seen that with this arrangement the hoisting mechanism will be automatically disconnected from the drive shaft of the motor when the hoisting mechanism reaches either elevated or lowered position. The clutch 53 may be shifted at any time by the operator through actuation of the lever 61, but in case said clutch member is not so shifted, the same will be automatically shifted when the hoisting mechanism reaches either of its terminals of movement.

In order to hold the truck body in dumped position and to control the descent thereof when returning to normal position, friction brake mechanism is provided coöperating with worm 46, as seen in Fig. 12. This brake mechanism comprises a plunger 70, which is arranged in a cylindrical extension of housing 45 at one end of said worm. Between the member 70 and the adjacent end of the worm is interposed a washer 70′, preferably of fiber. The plunger 70 is carried by a stem 71, which projects loosely through said worm, the outer end thereof being fixed in a lever 71 which is fulcrumed at 73 to the member 48. Spaced fingers 74 coöperate with the free end of said lever to hold the same against any lateral shifting, as will be readily understood. The plunger 70 and washer 70′ are pressed toward the worm 46 by means of a helical compression spring 75 which is interposed between said plunger and a screw plug 76 threaded into the outer end of the housing inclosing said plunger. The arrangement is such that in the dumping operation when the hoisting mechanism is disconnected from the drive shaft of the motor the pressure of spring 75 pressing the plunger 70 and washer 70′ toward the worms 46 will be sufficient to prevent any retrograde movement of the hoisting mechanism, thereby serving to lock the truck body in dumped position. This pressure upon the worm 46 may be relieved through engagement of the operator with the lever 72 in order to allow for the descent of the truck body when later desired.

With the construction set forth, it will be seen that in effecting the dumping of the truck body, it is only necessary for the operator to rock the upper end of lever 61 rearwardly. When this is done, operative connection will be established between the drive shaft of the motor truck and the hoisting mechanism so that the power of the truck motor will be utilized to operate the hoisting mechanism. When the truck body arrives at fully dumped position, the drive shaft of the truck will be automatically disconnected from the hoisting mechanism. If this disconnection is desired before this time, the same may be effected by the operator rocking forwardly the upper end of lever 61. This truck body will then be held in dumped position through the pressure of the spring 75 acting upon plunger 70 and friction washer 70′ to press the same against worm 46. This frictional engagement with the worm 46 is controlled by the operator engaging lever 72 in the descent of the truck body. Through the control thus afforded, too rapid descent may be avoided.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having described my invention, what I claim as new and desire to secure by Letters Patent is:—

1. The combination with a swingingly mounted body, of a hoist therefor, comprising a vertically movable elongated element operatively connected with said body; means for guiding said element in its vertical movement; a rotary element; a flexible element connecting said vertically movable element and said rotary element, whereby, upon rotation of the latter, the former will be moved vertically; means for driving said rotary element comprising a worm wheel operatively connected with said rotary element; a worm meshing with said worm wheel; means coöperating with said worm for checking descent of said body when the hoisting mechanism is disconnected therefrom, said last mentioned means comprising a friction member arranged for engagement with said worm; and manually operable means for moving said friction member toward and from said worm; substantially as described.

2. The combination with a swingingly mounted body, of a hoist therefor, comprising a vertically movable elongated element operatively connected with said body; means for guiding said element in its vertical movement; a rotary element; a flexible element connecting said vertically movable element and said rotary element, whereby, upon rotation of the latter, the former will be moved vertically; means for driving said rotary element, comprising a worm wheel operatively connected with said rotary element; a worm meshing with said worm wheel; means coöperating with said worm for checking descent of said body when the hoisting mechanism is disconnected therefrom, said last mentioned means comprising a friction member arranged for engagement with said worm; a stem connected with said friction member and projecting loosely through said worm; and an operating lever connected with said stem, substantially as described.

3. The combination with a swingingly mounted body, of a hoist therefor comprising a vertically movable elongated element operatively connected with said body; a rotary element; a flexible element connecting said vertically movable element and said rotary element; means for driving said rotary element, comprising a worm wheel operatively connected with said rotary element; a worm meshing with said worm wheel; and means coöperating with said worm for checking the descent of said body when the hoisting mechanism is disconnected therefrom, said last mentioned means comprising a friction member arranged for engagement with said worm, substantially as described.

4. The combination with a swingingly mounted body, of a hoist therefor comprising a vertically movable elongated element operatively connected with said body; a rotary element; a flexible element connecting said vertically movable element and said rotary element; means for driving said rotary element, comprising a worm wheel operatively connected with said rotary element; a worm meshing with said worm wheel; means coöperating with said worm for checking the descent of said body when the hoisting mechanism is disconnected therefrom, said last mentioned means comprising a friction member arranged for engagement with said worm; and manually operable means for moving said friction member toward and away from said worm, substantially as described.

5. The combination with a swingingly mounted body, of a hoist therefor comprising a vertically movable elongated element operatively connected with said body; a rotary element; a flexible element connecting said vertically movable element and said rotary element; means for driving said rotary element, comprising a worm wheel operatively connected with said rotary element; a worm meshing with said worm wheel; means coöperating with said worm for checking the descent of said body when the hoisting mechanism is disconnected therefrom, said last mentioned means comprising a friction member arranged for engagement with said worm; a stem connected with said friction member and projecting loosely through said worm; and an operating lever connected with said stem, substantially as described.

In testimony whereof I have signed my name to this specification in the presence of two subscribing witnesses.

WILLIAM H. KENNEDY.

Witnesses:
JOSHUA R. H. POTTS,
ARTHUR A. OLSON.